United States Patent [19]

Marshall

[11] Patent Number: 5,473,726
[45] Date of Patent: Dec. 5, 1995

[54] AUDIO AND AMPLITUDE MODULATED PHOTO DATA COLLECTION FOR SPEECH RECOGNITION

[75] Inventor: Patrick T. Marshall, Beavercreek, Ohio

[73] Assignee: The United States of America as represented by the Secretary of the Air Force, Washington, D.C.

[21] Appl. No.: 86,577
[22] Filed: Jul. 6, 1993
[51] Int. Cl.$^6$ ............................... G10L 5/06; G10L 7/08; A61M 36/02
[52] U.S. Cl. ........................... 395/2.4; 395/2.8; 250/221; 250/316.1; 250/495.1
[58] Field of Search ............................ 395/2, 2.63, 2.65, 395/2.4, 2.79, 2.8; 381/41, 42, 43; 250/221, 316.1, 495.1

[56] References Cited

U.S. PATENT DOCUMENTS

| | | | |
|---|---|---|---|
| 3,191,321 | 6/1965 | Nassimbene | 179/41 |
| 3,622,791 | 11/1971 | Bernard | 250/199 |
| 4,151,407 | 4/1979 | McBride et al. | 250/199 |
| 4,437,002 | 3/1984 | Taniguchi et al. | 250/338.3 |
| 4,757,541 | 7/1988 | Beadles | 395/2.63 |
| 4,769,845 | 9/1988 | Nakamura | 381/43 |
| 4,961,177 | 10/1990 | Uehara | 367/197 |
| 5,051,799 | 9/1991 | Paul et al. | 375/25 |
| 5,153,560 | 10/1992 | Ichikawa | 340/522 |

OTHER PUBLICATIONS

Integrated Modelling of Thermal and Visual Image Generation, Ott et al., IEEE 4–8 Jun. 1989, pp. 356–362.
NN Lipreading System for Improved Spech Recognition, Slork et al., IEEE 7–11 Jun. 1992, pp. 285–295.
Peripheral Vision Lip Reading Aid, Ebrahimi et al., IEEE Oct. 1991, pp. 944–952.
Integrated Analysis of Thermal and Visual Images for Science Analysis, Nandhakumar, IEEE Jul. 4, 1988.
Proceedings of Speech '85, Automatic Lipreading to Enhance Speech Recognition, Eric D. Petajan, AT&T Bell Laboratories, Jun. 19–23, 1985, San Francisco, Calif., IEEE Computer Society Conference on Computer Vision & Pattern Recognition.
Proceedings of Speech '88, A Multi-Channel Physiological Data Acquisition System Based on an IBM PC, and Its Application to Speech Therapy, 7th FASE Symposium, Edinburgh, IBM UK Scientific Centre and Department of Linquistic Science.

Primary Examiner—Allen R. MacDonald
Assistant Examiner—Richemond Dorvil
Attorney, Agent, or Firm—Gerald B. Hollins; Thomas L. Kundert

[57] ABSTRACT

A speech recognition data collection arrangement in which audio sounds spoken by the user are supplemented with lip and mouth movement information obtained from a combination of a light emitting diode and photodiode disposed immediately before the user's face is disclosed. The lip and mouth movement photo information is obtained in the form of an AC coupled amplitude modulated carrier waveform which results from energization of the light emitting diode from a pulsating or alternating current component inclusive source of electrical energy. The lip and mouth movement amplitude modulated carrier waveform is processed with filtering and envelope detection and communicated to a programmed digital computer for the purpose of dual-channel audio and photo based accomplishment of human speech recognition.

12 Claims, 2 Drawing Sheets

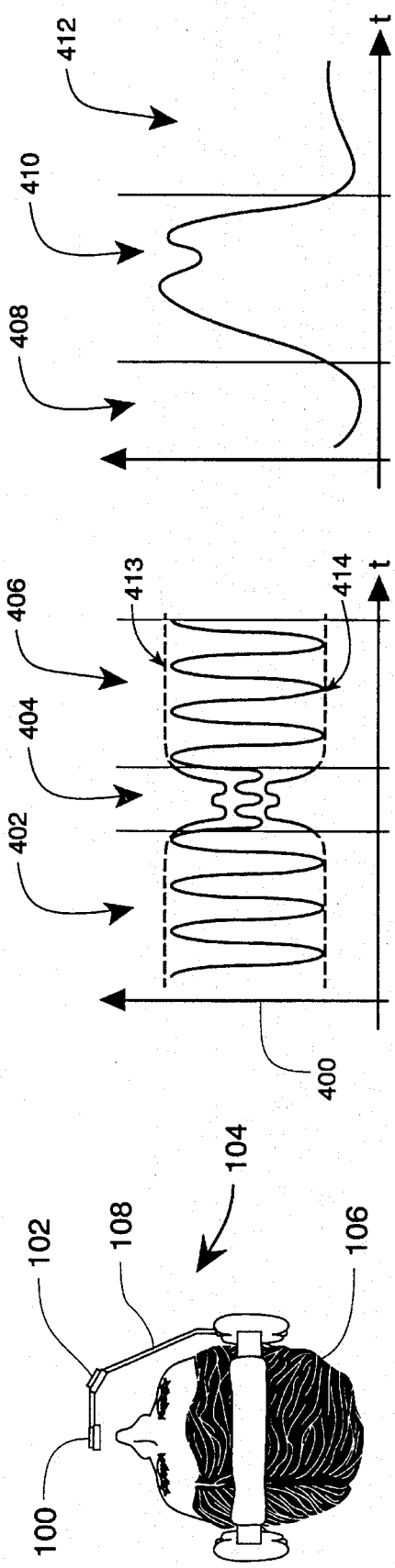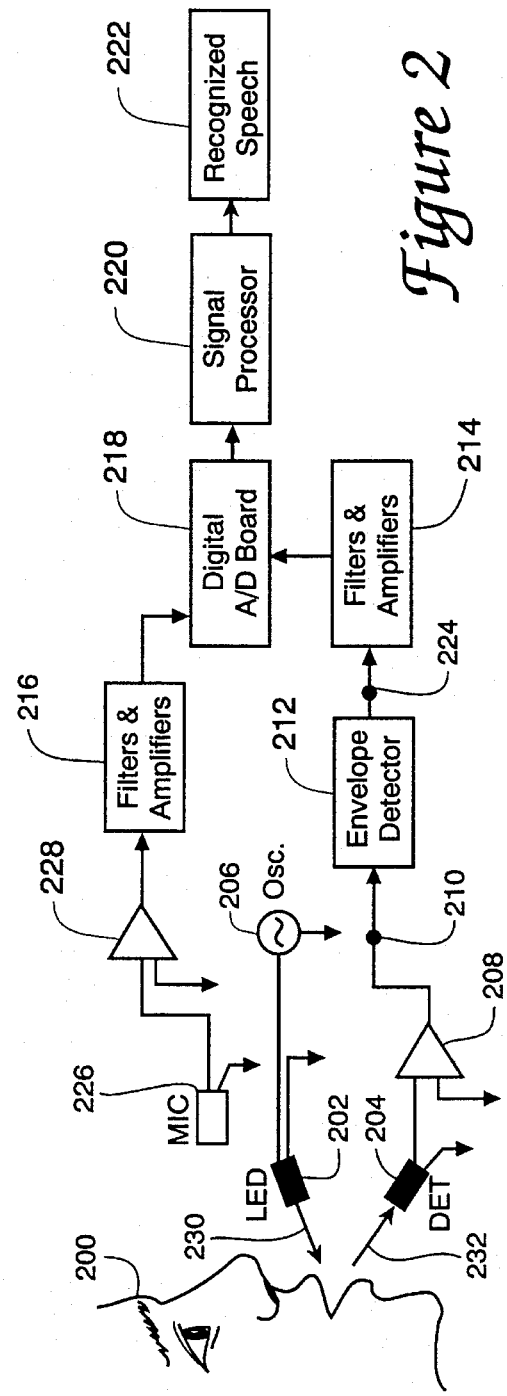

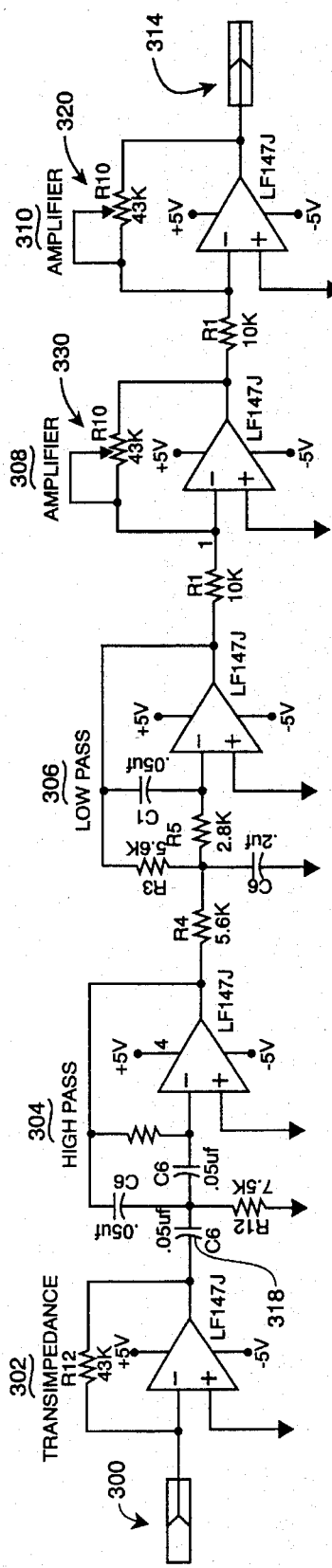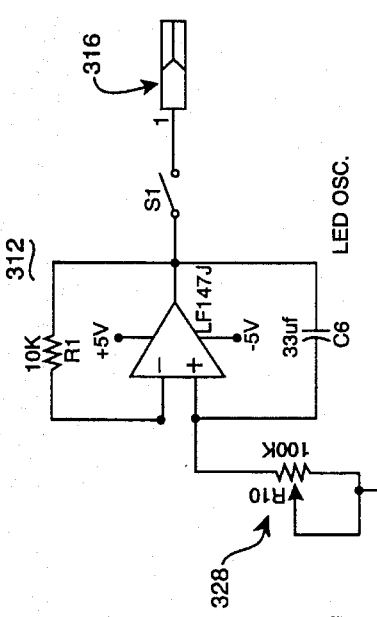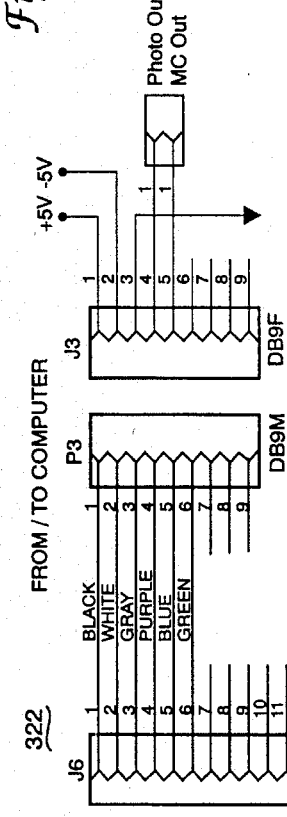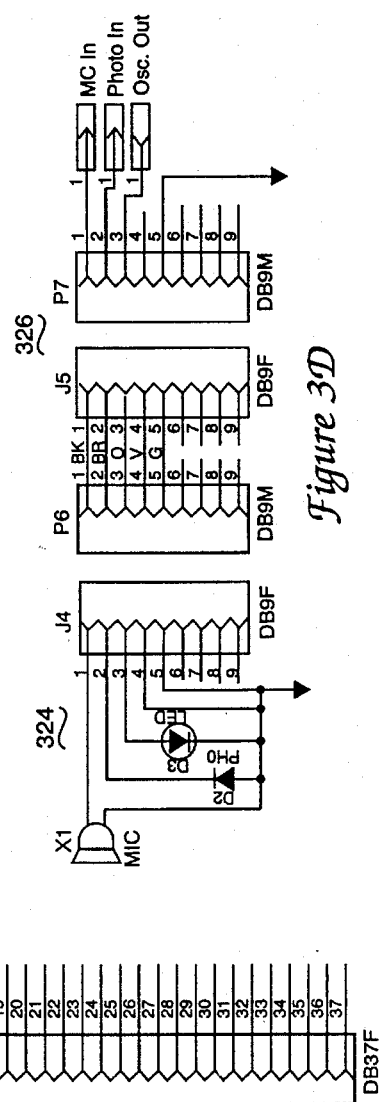
Figure 3A
Figure 3B
Figure 3C
Figure 3D

AUDIO AND AMPLITUDE MODULATED PHOTO DATA COLLECTION FOR SPEECH RECOGNITION

RIGHTS OF THE GOVERNMENT

The invention described herein may be manufactured and used by or for the Government of the United States for all governmental purposes without the payment of any royalty.

BACKGROUND OF THE INVENTION

This invention relates to the field of data collection for human speech recognition and to the use of a dual-channel audio and photo system for accomplishing such data collection.

Most present day speech recognition systems function by converting acoustic sound waves generated by human utterances into analog or digital data using special algorithms which consider only the audio information. There is, however, an additional source of information for speech recognition other than this audio signal which can be of significant benefit to the accuracy and speed of the speech recognition process. Deaf people, who are trained lip-readers, use this information by observing visual cues produced by the mouth and surrounding areas of a speaker. By way of the present invention, this same information is available in an improved format to an Automatic Speech Recognition (ASR) system and is believed to offer increased speech recognition accuracy and operating rates.

ASR is believed to offer a significant improvement in military environments including the control of a manned aircraft. The present human-machine interface in the cockpit of an aircraft appears to be nearing an upper limit of human capability since it is based on manual acts performed by the aircraft crew members and the time for performing such manual acts can be severely limited especially under combat conditions. Voice-controlled avionics will allow the pilot to command his/her aircraft simply by talking a manual control system the time requirement and interference with other activities imposed by a manual control system.

ASR can also be effectively used in the office or industrial environment especially in connection with computer and automatic data systems where, according to present day technology, the keyboard is the major avenue of communication from human to computer.

The lack of accuracy and reliability in presently available speech recognition equipment is a major reason for nonuse of speech recognition systems in these applications. By way of the improved data collection arrangement of the present invention, an addressing of this accuracy and reliability difficulty is believed possible.

The patent art includes a number of examples of combined photo and audio speech recognition systems. Included in this patent art is the U.S. Pat. No. 3,192,321 of E. G. Nassimbene, concerned with a headset having both microphone and photo pick-ups. Since the Nassimbene apparatus contemplates only a DC coupled photo signal collection and processing system, a ready distinction from the present invention is discernible.

The patent art of interest also includes U.S. Pat. No. 4,769,845 issued to H. Nakamura, concerned with a lip image speech recognition apparatus which employs a camera device in order to achieve data input. The non-camera or integrated image pick-up arrangement of the present invention is believed distinguished over this camera input nature of the Nakamura patent.

Also included in this patent art is U.S. Pat. No. 4,757,541 issued to R. L. Beadles, concerned with an audio visual speech recognitions system in which an optical scanning or a non-integrated photo signal pick-up is also employed.

Of additional interest with respect to the present invention is U.S. Pat. No. 4,961,177 which discloses a method and apparatus for inputting a voice through a microphone in which a camera system is used to keep the microphone located in an appropriate position with respect to a human speaker.

SUMMARY OF THE INVENTION

The present invention provides for the use of both photo and audio information in the speech recognition process. The photo component of this dual-channel information is herein based on lip and mouth area movements of the speaking or using person. According to the present invention, this photo information is obtained with an integrated image transducer device such as a photodiode and with the aid of a sinusoidal or square wave light source such as a light emitting diode. The resulting integrated image electrical signal information is therefore obtained in the form of an amplitude modulated carrier waveform signal. The integrated nature of the photo transducer is to be contrasted with a scanning image signal collection arrangement in which a camera tube, of the type used in television systems, for example, is employed for photo signal collection.

It is therefore an object of the present invention to provide a carrier frequency based electrical signal representation of speaker lip and mouth movement events for a speech recognition system.

It is also an object of the invention to provide a speech recognition system in which amplitude modulation of the carrier signal caused by lip and mouth movement is used.

It is another object of the invention to provide a lip movement sensing arrangement in which the employed signals are susceptible of AC (alternating current) coupling through succeeding signal amplifying and preprocessing circuitry.

It is another object of the invention to provide a dual-channel speech recognition data collection system in which freedom from signal drift in direct coupled amplifier stages is achieved.

BRIEF DESCRIPTION OF THE DRAWINGS

FIG. 1 shows an overhead view of a data collection headset apparatus in accordance with the present invention.

FIG. 2 shows use of a data collection apparatus according to the present invention in a block diagrammed ASR system.

FIG. 3A shows a light signal processing circuit according to the present invention in electrical schematic diagram form.

FIG. 3B shows an adjustable frequency oscillator source of energy for a light emitting diode used in the invention.

FIG. 3C shows computer connector wiring usable in embodying the invention.

FIG. 3D shows headset connector wiring usable in embodying the invention.

FIG. 4A shows representative signal waveforms at one point in the FIG. 2 block diagram.

FIG. 4B shows representative signal waveforms at a second point in the FIG. 2 block diagram.

DETAILED DESCRIPTION

FIG. 1, i.e. herein FIG. 1 in the drawings shows an overhead view of a transducer apparatus usable in the present invention to obtain signals from a human speaker or user. In the FIG. 1 drawing the user or speaker is shown at 106 and is provided with a headset 104 which includes a head mounted boom member 108 used to suspend a microphone 102 and a photo detector assembly 100 in predetermined locations before the face of the user 106.

In the FIG. 1 system, it is preferable for the microphone 102 to be mounted to the side of the mouth and lip region of the speaker 106 in order that the central location for the speaker's face be reserved for the photodetector array 100. In the present invention this photodetector assembly is preferably arranged to operate in the visible portion of the optical spectrum, that is this array includes a light emitting diode and a photodiode each of which operates with a maximum response point located in the visible portion of the optical spectrum.

Preferably, the photodetector array 100 is disposed in a close location, between one quarter and three quarters of an inch before the face of the user 106 in order to obtain the highest signal to noise ratio possible for the video signals originating in the FIG. 1 apparatus. A principal source of noise concern in the FIG. 1 apparatus are the 60 Hertz and 120 Hertz power frequency components originating in alternating current lighting systems such as fluorescent lamp apparatus. Special provisions for accommodating this source of unwanted noise are provided in the present invention apparatus as is disclosed below herein.

Desirable signal to noise ratio characteristics are also preferably achieved in the FIG. 1 apparatus through use of a photodiode element having a large active area and a light emitting diode optical energy source that is as bright as possible without incurring the risk of user injury. The photodiode of the present invention is preferably operated in the photovoltaic mode as an electrical current source that generates, when illuminated, an output signal proportional to the received light intensity. A fast response time from the photodiode element is not required since human lip movement activity is limited to frequencies in the range of 25 Hertz.

Additional details relating to the present invention are to be found in my copending patent applications, filed of even date herewith identified as Ser. No. 08/086,576 and Ser. No. 07/086,578 which are concerned with audio and infrared collection of speech recognition data and dual-channel collection and use of speech correction signals, respectively.

In addition to the two above incorporated-by-reference copending patent applications, additional information concerning the present invention is also to be found in my technical academic thesis titled "Speech Recognition Using Visible and Infrared Detectors" which was presented to the faculty of the School of Engineering of the Air Force Institute of Technology, of the United States Air Force Air University, in partial fulfillment of the requirement for the degree of Master of Science in Electrical Engineering and dated September 1992. Copies of this thesis may be obtained from the Air Force Institute of Technology at Wright-Patterson Air Force Base, OH 45433, and may also be obtained from the Defense Technical Information Center (DTIC) located at Cameron Station, Alexandria, Va. 22304-6145 using the DTIC identification number AD-A262490. The DTIC copies of my thesis carry a "selection date" of 5 Apr. 1993 and the thesis is approved for public release with unlimited distribution. The contents of this academic thesis are also hereby incorporated by reference herein. One copy of this academic thesis in printed media format is supplied along with the present application papers to the U.S. Patent and Trademark Office for use with any one of the three simultaneously filed patent applications.

Although the above referred-to academic thesis discloses the use of a direct coupled or direct current or DC lip movement sensor system, it is to be noted that the AC coupled or amplitude modulated carrier arrangement of the present invention is significantly improved over this DC coupled system in that amplifier drift and the accurate setting of amplifier operating points and dynamic ranges is significantly easier of accomplishment in the AC coupled system of the present invention.

FIG. 2 in the drawings shows a block diagram of the present invention speech recognition data collections system. In the FIG. 2 drawing, the audio microphone is indicated at 226 and its accompanying amplifier at 228 with further amplification and filtering being indicated at 216. The light emitting diode for illuminating the mouth and lip region of the user/speaker 200 is indicated at 202 in FIG. 2 with light from this source of optical energy traveling along the paths 230 and 232 toward and away from the user/speaker 200 in arriving at the photodiode detector 204. The source of pulsating energy used to excite the light emitting diode 202 and thereby provide an amplitude modulated carrier type of output signal from the detector 204 is shown at 206 in FIG. 2; this circuit is in the nature of an oscillator as is described in more detail in connection with FIG. 3 below.

Photo electrical signal from the detector 204 is amplified at 208 prior to arriving at the envelope detector circuit 212. Signal nodes preceeding and following the envelope detector 212 are indicated at 210 and 224 in the FIG. 2 drawing. Envelope detected signals from the circuit 212 are filtered and amplified in the block 214 before communication to the analog to digital conversion board at 218 and communication to the signal processor or electronic computer of the block 220. To avoid aliasing, the sampling rate of the analog to digital conversion board 218 must be at least twice the low-pass filter's cutoff frequency. Signal processing software for both microphone originated signals and lip movement originated signals in this signal processor 220 is available in the commercial market. In brief, such software in the processor 220 is required to perform the following functions:

1. An interface with the analog to digital conversion circuitry of the block 218.
2. Transformation of the audio word into its energy distribution format for word location assistance.
3. Execution of an envelope detector algorithm for the video signal when block 212 of FIG. 2 is to be implemented in software.
4. Location of word boundaries for both audio and video or photowords.
5. Comparison between word boundaries of both signals to verify word endpoints.
6. Coordinated signal word segmentation.
7. Audio word processing to obtain frequency spectrum data for obtaining specific feature information (e.g., formats, pitch, Linear Predictive Coding, zero crossing, etc.).

8. Normalization of both audio and photo words.

9. Comparison of audio and visual words to their respective ideal word template data using dynamic time warping algorithms.

10. Result comparison between two types of word decision and election of the most probable word identity.

The above described software oriented signal processing in the block 220 may, of course, be replaced with a hardware oriented signal processing sequence as will be recognized by persons skilled in the electronic art. In lieu of computer program steps, such hardware oriented signal processing is accomplished with wired logic circuitry.

FIG. 3A in the drawings shows an electrical schematic diagram of the circuitry used in connection with the light emitting diode 202 and the photodiode 204 in FIG. 2, that is, circuitry which includes the amplifier 208. In the FIG. 3A schematic diagram a series of six operational amplifiers are shown to be connected into a combination amplifier and filtering network and also to be connected as an oscillator source of pulsating signals used to energize the light emitting diode 202.

In the FIG. 3A schematic diagram, current source signals from the photodiode 204 are received at the terminal 300 and communicated to the transimpedance connected operational amplifier 302 where these current source signals are converted to voltage signals. The capacitor C6 at 318 in FIG. 3A provides the above referred-to AC coupling in the FIG. 3A circuitry and communicates the amplitude modulated carrier waveform from the transimpedance amplifier 302 to the high-pass filter connected operational amplifier 304. The amplifier 304 is arranged as a two-pole gain of unity circuit with a lower cutoff frequency of 200 Hertz.

Signals from the high-pass amplifier 304 are sent to the low-pass filter amplifier 306, this amplifier also being arranged to have a gain of unity and being of the two-pole low-pass filter type with an upper bandpass frequency of 400 Hertz. Signals from this low-pass amplifier 306, signals which are now bandpass filtered between the frequencies of 200 and 400 Hertz are communicated to the two variable gain amplifiers 308 and 310 for amplification to a voltage level at the terminal 314 which is usable in the analog to digital converter circuit of the block 218 in FIG. 2. Gain adjustment or gain selection in these two variable gain amplifiers is accomplished by the two potentiometers 320 and 330, respectively. Each of the amplifiers 302, 304, 306, 308, and 310 in FIG. 3A is connected into a polarity inverting configuration by use of the negative or summing node terminal thereof as an input terminal.

At 312 in FIG. 3B is shown the adjustable frequency oscillator circuit which also employs an operational amplifier that is used to provide a pulsating energization for the light emitting diode 202 in the FIG. 2 block diagram. The feedback capacitor and the variable resistor 328 of the amplifier 312 are used to select the preferred 279 Hertz operating frequency of the light emitting diode 202 in FIG. 2.

The electrical wiring of the headset 104 in FIG. 1 is shown at 324 in the FIG. 3D diagram with the light emitting diode, the photodiode, and the microphone element being represented. The connectors and wiring at 326 in FIG. 3D are used to convey signals to and from the headset received apparatus depicted at 324. Wiring to and from the computer 220 is shown in FIG. 3C.

Both the frequency selection aspects of the FIG. 3A and FIG. 3B circuitry and the AC coupled nature of the amplifier and filter sequence in the FIG. 3A circuit are to be noted. Each of these arrangements contributes to the desirable and improved results of the present invention data collection apparatus in comparison with previously known speech recognition arrangements.

FIG. 4 in the drawings shows an example of waveforms to be expected at the two nodes 210 and 224 in the FIG. 2 block diagram. These two nodes which precede and follow the envelope detector 212 are energized with signals which especially characterize the present invention. On the coordinate axis set 400 in FIG. 4A is displayed a sequence of waveforms as would represent mouth closed followed by mouth opened and mouth closed conditions for the user 200 in FIG. 2. In the first mouth closed of these waveforms at 402 a relatively high amplitude reflection signal is shown to exist at the node 210, this signal being, of course, of a pulsated or alternating current nature as a result of energization of the light emitting diode 202 by the pulsating energy source of the oscillator 312 in FIG. 3B.

This large amplitude mouth closed signal at 402 is followed by a smaller amplitude mouth opened signal indicated at 404. This mouth opened signal is followed by another mouth closed signal indicated at 406. The smaller amplitude of the mouth opened signal at 404 is a result, of course, of lower reflection from the output of the light emitting diode 202 in the mouth opened condition.

In the waveforms of FIG. 4B this same mouth closed mouth opened and mouth closed sequence of signals from FIG. 4A is shown following the occurrence of envelope detection in the block 212.

Since both the top and bottom envelops (dashed lines 413 and 414 of FIG. 4A) are identical, only the lower envelope 414 of FIG. 4A's waveform is used to create the waveform shown in FIG. 4B. This is accomplished in order that the photo signal's word boundaries be easily compared to the audio signal's amplitude spectrum.

Alternate arrangements of the present invention may include the use of heat shrink tubing or other shields placed over the photodiode and, in addition, possibly over the light emitting diode for the purpose of reducing ambient light or sunlight interference. In another arrangement of the invention the dual-channel signals, that is the photo and audio signals collected by the described apparatus, may be subjected to Fourier transformation for mathematical processing in the frequency domain and then subjected to inverse Fourier transformation for return to the time domain. Fourier transformation of such signals and the resulting processing in the frequency domain is known in the art to provide additional and helpful information with regard to the speech recognition phenomenon.

In the above described arrangement of the invention the photodiode element 204 is preferably operated in the photovoltaic mode-of-operation as a current source. In such operation the signal output of the photodiode is coupled to a load such as the summing node of an operational amplifier. Alternately, the photodiode may also be operated in the photo conductive mode of operation where in its response is faster, but however is accompanied by the disadvantage of a lower signal-to-noise ratio.

In the above described arrangement of the invention, a carrier frequency of 279 Hertz has been selected in order that a convenient 200 to 400 Hertz bandpass filter arrangement be usable and in order to avoid fundamental and harmonic frequencies of the 60 cycle power frequency. Clearly many carrier frequencies can meet these objectives and may be desirable for other arrangements of the invention.

The above described embodiment of the invention employs carrier modulated signal waveform in order that the need for direct coupling in the circuitry following the photodiode be avoided. This arrangement is to be preferred for practical reasons including the tendency of DC amplifiers to drift and the difficulty of avoiding offset voltages in a DC coupled signal path.

It is also possible, however, to use such a direct current energized light emitting diode and a DC coupled signal path, particularly with automatic offset compensation capability included, as an alternate arrangement of the present multiple channel speech recognition data collection apparatus.

A significant advantage of the video information resulting from lip and mouth movement signals in the present invention attends the ability of such lip and mouth movement data to enable more accurate word division in the subsequent processing of speech recognition signals. Information regarding this capability is to be found in my above incorporated by reference academic thesis.

Given the variability of speech information from person to person, from male to female, from location to location and from individual personal preferences for word enunciation, it is clearly understandable that progress in the field of continuous speech recognition (as opposed to isolated word recognition) has indeed been tedious and slow. By way of the additional information provided by the present invention speech recognition data collection, it is believed that additional steps forward in this complex technical task are now possible.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. Dual-channel, optical energy and sound energy, human speech recognition data collection apparatus comprising the combination of:

a user's head-carried headset apparatus including a boom end received speech actuated microphone transducer member located close to lip and mouth cavity facial regions of said user;

light emitting diode means disposed adjacent said microphone transducer member at said boom end for illuminating said lip and mouth cavity regions of said user with visible spectrum optical energy;

pulse modulated electrical energy source means, of fixed predetermined operating frequency, connected with said light emitting diode means, for pulsed electrical energizing of said light emitting diode means and for pulsed optical energy generation therein;

electrical photodiode transducer means disposed adjacent said microphone transducer member for generating a user's lip movement responsive amplitude modulated electrical signal having a carrier component of said predetermined frequency and having signal correlation with a voice generated electrical signal from said microphone transducer member;

dual-channel electrical conduction means for communicating electrical signals from said microphone transducer member and said photodiode electrical transducer means to a spoken sound and lip movement correlation speech recognition electrical signal processor.

2. The apparatus of claim 1 wherein said electrical photodiode transducer means includes an electrical photodiode member and further including electrical circuit means for operating said photodiode member in a photovoltaic, current source mode of operation.

3. The apparatus of claim 2 wherein said electrical circuit means includes an operational amplifier circuit and wherein an electrical current output signal of said photodiode member is connected with a summing node electrical input terminal of said operational amplifier.

4. The apparatus of claim 1 wherein said electrical energy source means predetermined operating frequency is displaced in spectral location from fundamental and harmonic frequencies of a sixty Hertz power line frequency.

5. The apparatus of claim 4 wherein said electrical energy source means predetermined operating frequency is between two hundred and four hundred Hertz.

6. The apparatus of claim 5 wherein said electrical energy source means predetermined operating frequency is two hundred seventy nine Hertz.

7. The method of collecting coordinated vocal and lip movement signals for dual-channel human speech recognition correlated processing comprising the steps of:

disposing an audio sound to electrical signal transducing microphone adjacent a lip and mouth cavity facial area of a user subject, said microphone generating electrical signals representative of user speech sounds;

illuminating a predetermined mouth and lip facial portion of said user with visible spectrum light energy originating in a light emitting diode electrical energy to optical energy transducer disposed adjacent said microphone;

energizing said light emitting diode with pulsating electrical energy of predetermined pulsation frequency, said illuminating visible spectrum light energy being also pulsated at said pulsation frequency;

collecting user lip-reflected illumination energy in a photodiode optical signal to electrical signal transducer, said collected energy generating a lip movement modulated electrical signal of said predetermined pulsation frequency, carrier frequency and lip movement responsive carrier amplitude modulation at output terminals of said photodiode transducer;

locating said photodiode optical signal to electrical signal transducer adjacent said microphone and said light emitting diode and proximate a predetermined portion of said user's lips and mouth cavity; and communicating said microphone electrical signals and said photodiode electrical signals via separate communication paths to a correlated dual-channel human speech recognition processor means for speech recognition processing.

8. The method of claim 7 wherein said disposing, illuminating, and locating steps each comprise mounting said microphone, light emitting diode, and photodiode transducers on a distal end of a headset carried microphone boom arm.

9. The method of claim 7 wherein said pulsating electrical energy pulsation frequency is above one hundred twenty Hertz.

10. The method of claim 7 wherein said communicating step includes electrical signal transmission via a two-path flexible electrical tether cord.

11. The method of claim 7 wherein said correlated dual-channel human speech recognition processor means includes signal processing in a hardware implemented speech recognition algorithm.

12. The method of claim 7 wherein said correlated dual-channel human speech recognition correlated processor means includes signal processing in a software implemented speech recognition algorithm.

* * * * *